United States Patent
Hyun et al.

(10) Patent No.: US 10,194,778 B2
(45) Date of Patent: Feb. 5, 2019

(54) DUST COLLECTOR FOR VACUUM CLEANER

(71) Applicant: LG ELECTRONICS INC., Seoul (KR)

(72) Inventors: Kietak Hyun, Seoul (KR); Seungyeop Lee, Seoul (KR); Hyukjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 15/000,878

(22) Filed: Jan. 19, 2016

(65) Prior Publication Data

US 2016/0206169 A1    Jul. 21, 2016

(30) Foreign Application Priority Data

Jan. 19, 2015  (KR) .................. 10-2015-0008869

(51) Int. Cl.
*B01D 50/00*   (2006.01)
*A47L 9/16*    (2006.01)
(Continued)

(52) U.S. Cl.
CPC ............ *A47L 9/1633* (2013.01); *A47L 9/165* (2013.01); *A47L 9/1608* (2013.01); (Continued)

(58) Field of Classification Search
CPC .... A47L 9/1633; A47L 9/1683; A47L 9/1658; A47L 9/165; A47L 9/1608; A47L 9/1641; (Continued)

(56) References Cited

U.S. PATENT DOCUMENTS

| 3,386,588 | A | * | 6/1968 | Ades | ...................... B04C 5/28 209/728 |
| 3,425,192 | A | * | 2/1969 | Davis | ................. A47L 9/1625 209/711 |

(Continued)

FOREIGN PATENT DOCUMENTS

JP          52-175211       12/1977
JP          H 03-080955      4/1991
(Continued)

OTHER PUBLICATIONS

International Search Report issued in Application No. PCT/KR2016/000514 dated May 17, 2016.
(Continued)

*Primary Examiner* — Dung H Bui
(74) *Attorney, Agent, or Firm* — KED & Associates, LLP (57) ABSTRACT

A dust collector for a vacuum cleaner, including a first cyclone disposed within an outer case to filter out dust from air introduced from an outside thereof and introduce the air from which dust has been filtered out to an inside thereof, a second cyclone accommodated in the inside of the first cyclone to form a first space between the first cyclone and the second cyclone to separate fine dust from the air introduced to the inside of the first cyclone, and a guide vane spirally extended along an inner circumference of the second cyclone to induce rotational flow to the air introduced to an inside of the second cyclone through an inlet of the second cyclone via the first space, wherein the guide vane is integrally provided on the second cyclone.

17 Claims, 7 Drawing Sheets

(51) Int. Cl.
  *B01D 45/12* (2006.01)
  *B01D 45/16* (2006.01)
  *B04C 3/06* (2006.01)
  *B04C 5/26* (2006.01)

(52) U.S. Cl.
  CPC ............ *A47L 9/1641* (2013.01); *A47L 9/1658* (2013.01); *A47L 9/1666* (2013.01); *A47L 9/1683* (2013.01); *B01D 45/12* (2013.01); *B01D 45/16* (2013.01); *B01D 50/002* (2013.01); *B04C 3/06* (2013.01); *B04C 5/26* (2013.01)

(58) Field of Classification Search
  CPC ...... B01D 45/16; B01D 45/12; B01D 50/002; B04C 3/06; B04C 2003/006
  See application file for complete search history.

(56) References Cited

U.S. PATENT DOCUMENTS

| | | | | |
|---|---|---|---|---|
| 3,469,566 | A | * | 9/1969 | Wilkinson ............ F02M 35/022 55/347 |
| 3,541,766 | A | * | 11/1970 | Wilson .................... B01J 8/005 55/319 |
| 3,631,657 | A | * | 1/1972 | Wilson .................... B01J 8/005 55/348 |
| 3,713,280 | A | * | 1/1973 | Keller .................... B01D 45/12 260/998.18 |
| 4,289,611 | A | * | 9/1981 | Brockmann ............. B04C 3/04 209/710 |
| 6,428,589 | B1 | * | 8/2002 | Bair ...................... A47L 9/1608 15/353 |
| 8,679,211 | B1 | * | 3/2014 | Makarov ............... A47L 9/1641 55/343 |
| 2007/0234691 | A1 | | 10/2007 | Han et al. |
| 2008/0155947 | A1 | * | 7/2008 | Oh ........................ A47L 9/1625 55/345 |
| 2009/0031524 | A1 | * | 2/2009 | Courtney ............... A47L 9/1625 15/347 |
| 2009/0100810 | A1 | * | 4/2009 | Smith .................... A47L 9/1625 55/343 |
| 2009/0113859 | A1 | | 5/2009 | Oh et al. |
| 2009/0205299 | A1 | | 8/2009 | Oh |
| 2009/0241491 | A1 | | 10/2009 | Han et al. |
| 2010/0115727 | A1 | | 5/2010 | Oh |
| 2012/0117753 | A1 | | 5/2012 | Kim et al. |
| 2014/0059983 | A1 | * | 3/2014 | Ho ........................ B01D 45/16 55/343 |

FOREIGN PATENT DOCUMENTS

| | | |
|---|---|---|
| JP | H 09-155239 | 6/1997 |
| JP | 2004-229827 | 8/2004 |
| JP | 3172934 | 12/2011 |
| WO | WO 2009/104959 | 8/2009 |

OTHER PUBLICATIONS

Japanese Office Action dated May 22, 2018 issued in Application No. 2017-555195.

\* cited by examiner

DUST COLLECTOR FOR VACUUM CLEANER

CROSS-REFERENCE TO RELATED APPLICATION(S)

Pursuant to 35 U.S.C. § 119(a), this application claims the benefit of earlier filing date and right of priority to Korean Application No. 10-2015-0008869, filed on Jan. 19, 2015, the contents of which is incorporated by reference herein in its entirety.

BACKGROUND

1. Field

The present disclosure relates to a dust collector for a vacuum cleaner configured to collect dust and fine dust through a multi-cyclone.

2. Background

A vacuum cleaner is an apparatus configured to introduce air using suction power formed by a suction motor and separate dust or dirt from the air to discharge clean air. The types of vacuum cleaners may be divided into i) a canister type, ii) an upright type, iii) a hand type, iv) a cylindrical floor type, and the like.

The canister type vacuum cleaner is a vacuum cleaner mostly used at home, which is a vacuum cleaner with a method of communicating a suction nozzle with a body through a connecting member. The canister type may include a cleaner body, a hose, a pipe, a brush, and the like, and be suitable to clean a solid floor due to performing cleaning only with suction power.

The upright type vacuum cleaner may include a suction nozzle and a body that are integrally shaped. The upright type vacuum cleaner may include a rotary brush, and thus clean up dust or the like within a carpet, contrary to the canister type vacuum cleaner. However, vacuum cleaners in the related art have drawbacks as follows.

For vacuum cleaners having a multi-cyclone structure, each cyclone is vertically oriented, which may cause a problem of increasing the height of a dust collector. Further, the dust collector is designed to have a slim profile to solve such a height increase issue, thereby causing a disadvantage of reducing the volume of a space for collecting actual dust.

In order to solve the foregoing problem, a structure in which a second cyclone is arranged within a first cyclone has been proposed, but it is difficult to efficiently locate the second cyclone within the first cyclone due to interference between the guide passages of the second cyclone. Even when the second cyclone is arranged within the first cyclone, the number of second cyclones may be decreased to reduce suction power, thereby resulting in the deterioration of cleaning performance.

In the case of a typical multi-cyclone in the related art, as air introduced into the collector passes through the first cyclone, the flow speed of air decreases, thereby causing a problem in which air that has passed through the first cyclone is unable to be efficiently introduced into the second cyclone. Even though air that has passed through the first cyclone is introduced into the second cyclone, air introduced into the second cyclone does not have a strong rotational force, thereby causing a problem in the performance of separating fine dust from the introduced air.

In particular, a tangential inhalation type cyclone structure in the related art may be provided with a guide passage for tangentially introducing air and fine dust to an inside of the cyclone. The foregoing tangential inhalation type cyclone structure has low passage usability, and the size of the cyclone decreases due to the installation of the guide passage, thereby causing a problem of increasing the entire passage loss.

Furthermore, in case of the first and the second cyclone, air containing dust may move within a small space, thus resulting in a complicated structure as well as causing a problem of requiring a complicated manufacturing process. On the other hand, for cleaners in the related art, there exists a limit in providing the user's convenience during the dust discharge process. There are vacuum cleaners in which dust is blown away during the process of discharging the dust, as well as vacuum cleaners requiring a very complicated dust discharge process.

BRIEF DESCRIPTION OF THE DRAWINGS

Embodiments will be described in detail with reference to the following drawings in which like reference numerals refer to like elements, and wherein.

DETAILED DESCRIPTION

Figure 1:
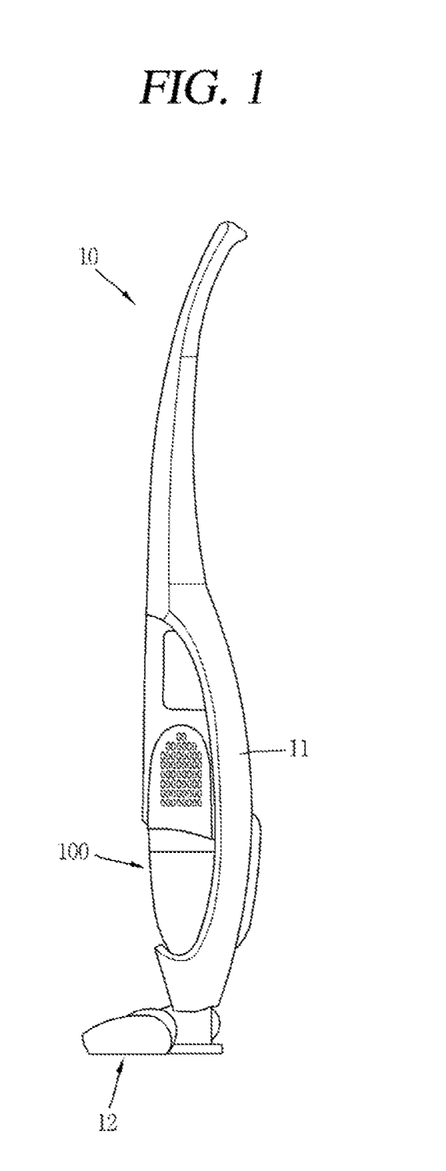
FIG. 1 is a perspective view illustrating an example of a vacuum cleaner according to an embodiment.

FIG. 1 is a perspective view illustrating an example of a vacuum cleaner 10 according to an embodiment. The vacuum cleaner 10 may include a power unit or system, a cleaner body 11, a suction unit or component 12, and a dust collector 100. The power unit may be configured to receive power from an outside to supply power to an inside of the cleaner body 11. The power unit may be a battery incorporated in the body or a power cable connected to the body.

The cleaner body 11 may include a fan unit or fan configured to receive power from the power unit to generate suction power. The fan unit may include a suction motor and a suction fan, and the suction fan may be connected to the suction motor and rotate according to the driving of the suction motor to generate suction flow and inhale outside air.

The suction unit 12 provided with a suction nozzle may be formed at a lower end portion of the cleaner body 11. Air and foreign substances may be inhaled through the suction nozzle by suction power generated by the suction fan, and introduced into the dust collector 100. The dust collector 100 may be configured to separate and collect foreign substances from the inhaled air, and discharge air from which dust is separated. The dust collector 100 may be detachably connected to the cleaner body 11.

Figure 2:
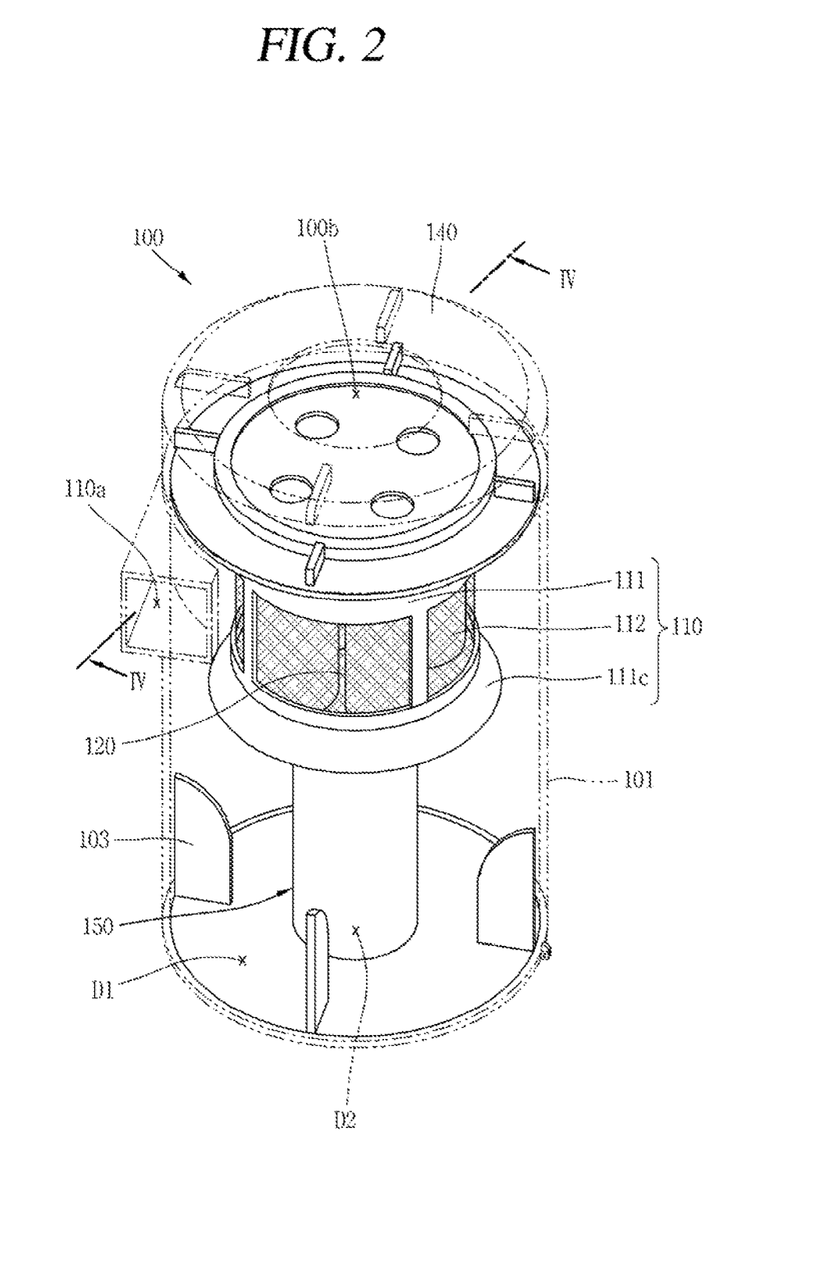
FIG. 2 is a view illustrating a dust collector according to an embodiment illustrated in FIG. 1.
Figure 3:
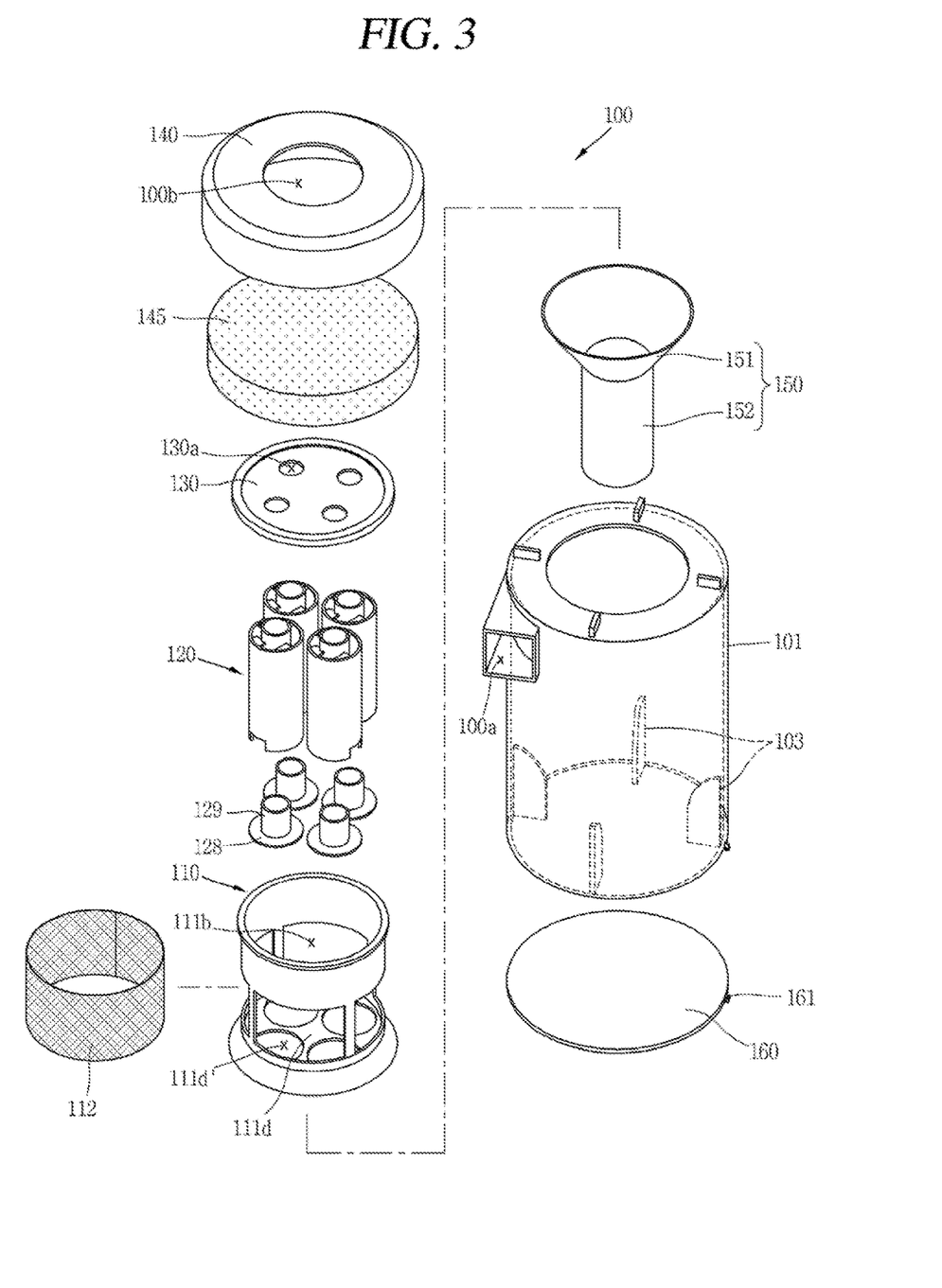
FIG. 3 is a view in which the internal major configurations of a dust collector illustrated in FIG. 2 are shown in a separate manner.
Figure 4:
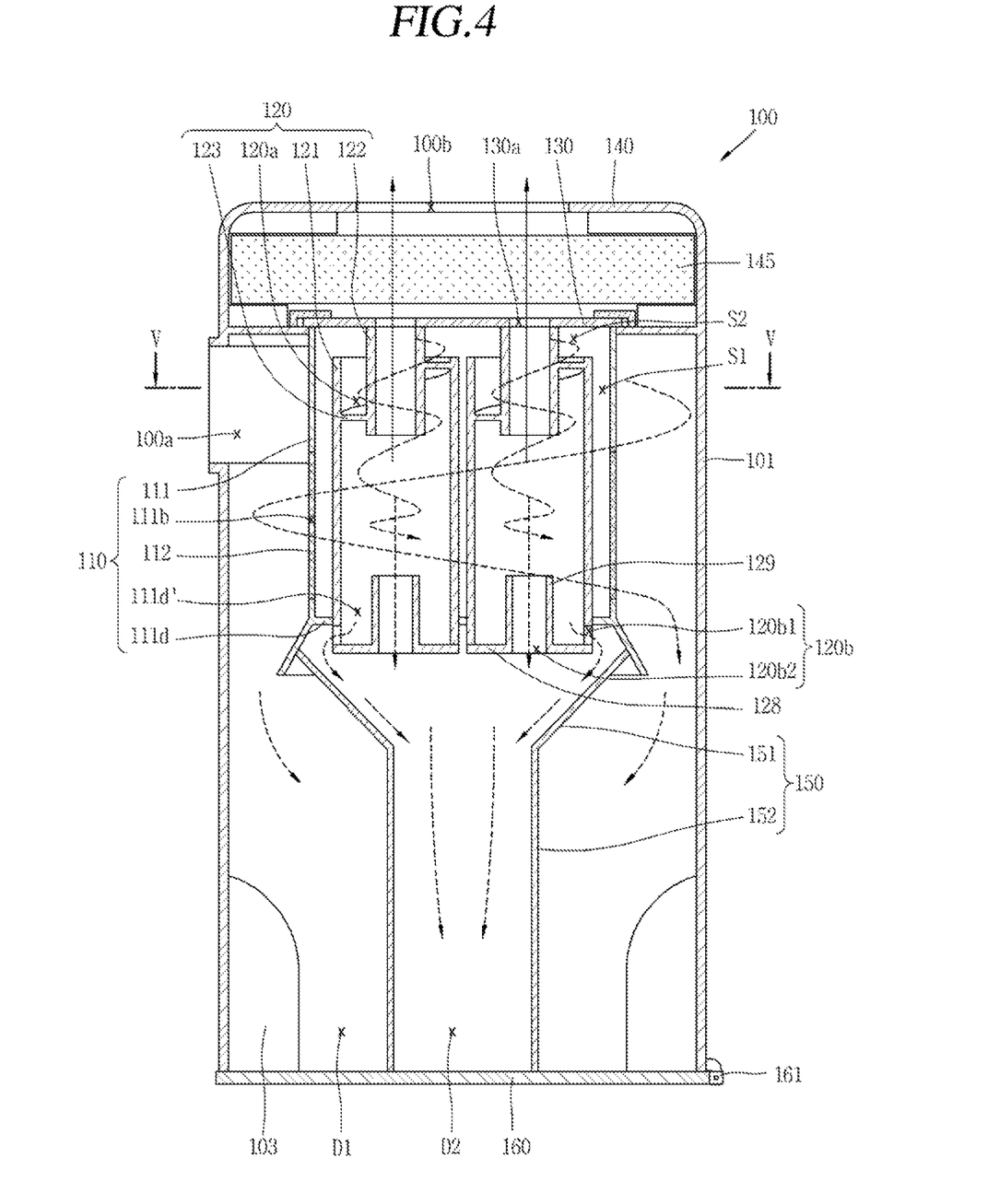
FIG. 4 is a longitudinal cross-sectional view in which the dust collector of FIG. 2 is cut and seen along line IV-IV.
Figure 5:
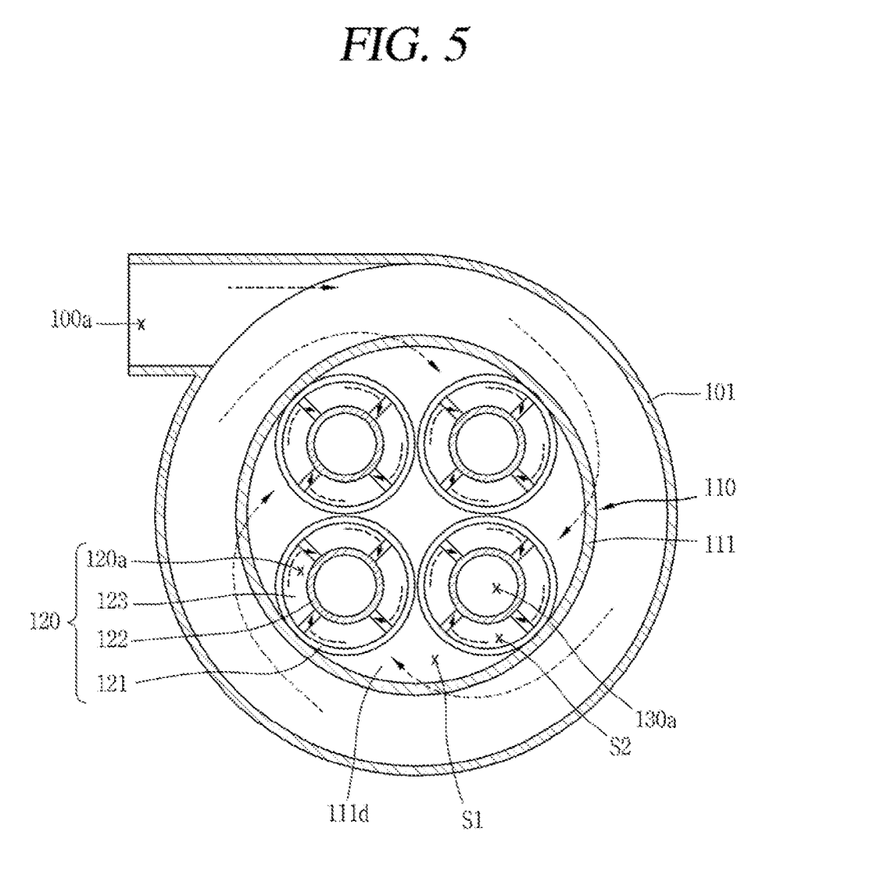
FIG. 5 is a longitudinal cross-sectional view in which the dust collector of FIG. 4 is cut and seen along line V-V.

Hereinafter, the dust collector 100 according to an embodiment will be described in detail. The entire configuration of the dust collector 100 and the flow of air and foreign substances within the dust collector 100 will be described in FIGS. 2 through 5. FIG. 2 is a view illustrating the dust collector 100 according to an embodiment illustrated in FIG. 1, and FIG. 3 is a view in which the internal major configurations of the dust collector 100 illustrated in FIG. 2 are shown in a separate manner, and FIG. 4 is a longitudinal cross-sectional view in which the dust collector 100 of FIG. 2 is cut and seen along line IV-IV. FIG. 5 is a longitudinal cross-sectional view in which the dust collector 100 of FIG. 4 is cut and seen along line V-V.

A specific structure associated with the characteristics of embodiments will be described with reference to FIG. 6. For reference, the present drawings illustrate the dust collector 100 applied to an upright type vacuum cleaner 10, but the dust collector 100 may not be necessarily limited to the upright type vacuum cleaner 10. The dust collector 100 according to embodiments may also be applicable to a canister type vacuum cleaner 10.

Referring to the above drawings, air and foreign substances generated from the fan unit of the vacuum cleaner 10 may be introduced to an entrance 100a of the dust collector 100 through the suction unit 12 by suction power generated by the fan unit of the vacuum cleaner 10. The air introduced to the entrance 100a may be sequentially filtered at the first cyclone 110 and second cyclone 120 while flowing along a passage, and discharged through an exit 100b. Dust and fine dust separated from the air may be collected into a dust storage unit or compartment (D1) and a fine dust storage unit or compartment (D2) of the dust collector 100 which will be described later.

A cyclone may refer to an apparatus for providing rotational flow to a medium in which particles are floating to separate particles from the medium by a centrifugal force. The cyclone may separate foreign substances such as dust, fine dust, and the like from air introduced to an inside of the cleaner body 11 by suction power. According to the present specification, relatively large substances may be referred to as "dust," and relatively small substances may be referred to as "fine dust," and dust smaller than "fine dust" may be referred to as "ultra-fine dust."

The dust collector 100 may include an outer case 101, the first cyclone 110, the second cyclone 120 and a guide vane 123. The outer case 101 may form a lateral appearance of the dust collector 100. The outer case 101 may be formed in a cylindrical shape as illustrated in the drawing, but may not necessarily be limited to this. For example, the outer case 101 may also be formed in a polygonal columnar shape.

The entrance 100a of the dust collector 100 may be formed on the outer case 101. The entrance 100a may be formed to be extended toward an inner circumference of the outer case 101 to allow air and foreign substances to be tangentially introduced into the outer case 101 and revolved along the inner circumference of the outer case 101. As illustrated in the drawing, the entrance 100a may be formed at an upper portion of the outer case 101.

Air and foreign substances may rotate in a first direction along an inner circumference of the outer case 101, and referring to FIG. 5, an example is illustrated in which the flow of air containing foreign substances may rotate in a clockwise direction. The first direction may coincide with a rotational flow direction when air and fine dust that have passed through the first cyclone 110 are introduced to an inside of the second cyclone 120, and the structure of the guide vane 123.

The first cyclone 110 may be installed within the outer case 101. The first cyclone 110 may be configured to filter out dust from air introduced along with foreign substances, and collect the filtered dust in the dust storage unit (D1). As illustrated in the drawing, the first cyclone 110 may be arranged at an upper portion within the outer case 101.

The first cyclone 110 may include a housing 111 and a mesh filter 112. The housing 111 forms an outer appearance of the first cyclone 110, and may be formed in a cylindrical shape similar to the outer case 101. The housing 111 may be provided at an upper portion of the outer case 101, wherein the housing 111 may be integrally formed with the outer case 101 or configured to be coupled to the outer case 101.

The housing 111 may be formed in a shape in which an inside of the housing is hollow to accommodate the second cyclone 120. An opening portion or an opening 111b communicating with an inside of the housing 111 may be formed on an outer circumference thereof. The opening portion 111b may be formed at a plurality of positions along the outer circumference of the housing 111 as illustrated in the drawing.

The casing 121 of the second cyclone 120 may be installed to pass through the bottom surface 111d of the first cyclone 110, and to this end a through hole 111d' may be formed on the bottom surface 111d of the first cyclone 110. FIG. 3 illustrates an example in which the bottom surface 111d provided with a through hole 111d' may be integrally formed with the housing 111. The housing 111 may be extended with the same cross-sectional area along a downward direction as illustrated in the drawing, but may have a structure of gradually narrowing downward.

The mesh filter 112 may be installed on the housing 111 to cover the opening portion 111b, and may have a mesh or porous shape to allow air to pass therethrough. The mesh filter 112 may be formed to separate dust from air introduced into the housing 111. The criteria of separating dust from fine dust may be determined by the mesh filter 112. Foreign substances having a size of being allowed to pass through the mesh filter 112 may be divided into fine dust, and foreign substances having a size of not being allowed to pass through the mesh filter 112 may be divided into dust.

Considering the process of separating dust by the first cyclone 110 in detail, air and foreign substances may be introduced into an annular space between the outer case 101 and first cyclone 110 through the entrance 100a of the dust collector 100 to rotationally move in the annular space. During this process, relatively heavy dust may gradually flow down while rotationally moving in a spiral shape in a space between the outer case 101 and first cyclone 110 by a centrifugal force. A skirt 111c may be formed in a protruding manner at a lower portion or end of the housing 111 along an outer circumference of the housing to prevent the scattering of dust collected in the dust storage unit (D1). Referring to FIG. 3, an example is illustrated in which the skirt 111c may be extended in an inclined manner toward the lower side.

Air may be introduced into the housing 111 through the mesh filter 112 by suction power. Fine dust may be also introduced into the housing 111 along with the air. Referring to FIG. 4, it may be possible to check the internal structure of the dust collector 100 and the flow of air and foreign substances within the dust collector 100.

The second cyclone 120 may be arranged within the first cyclone 110, wherein the second cyclone 120 may be configured to separate air and fine dust introduced into the second cyclone 120 through an inlet 120a. Contrary to a vertical arrangement in the related art in which the second cyclone is arranged on top of the first cyclone, the second cyclone 120 of this embodiment may be accommodated inside the first cyclone 110, thereby reducing the height of the dust collector 100. The second cyclone 120 may be formed not to protrude from an upper portion of the first cyclone 110.

The second cyclone in the related art has a guide passage extended from one side thereof to allow air and fine dust to be tangentially introduced to an inside of the second cyclone to rotate along an inner circumference of the second cyclone, but the second cyclone 120 according to this embodiment may not have such a guide passage. Accordingly, the second cyclone 120 may have a circular shape when viewed from above.

The second cyclone 120 may be provided with a casing 121 forming an outer appearance of the second cyclone 120, and the casing 121 may be formed in a cylindrical shape as a whole. The structure may be beneficial to secure a space of forming an upper and a lower mold of the casing 121 during the injection molding of the second cyclone 120. Accordingly, the guide vane 123 may be integrally formed into the second cyclone 120. In particular, the guide vane 123 may be integrally formed with the casing 121 and a vortex finder or chimney 122.

A plurality of second cyclones 120 may be provided within the first cyclone 110, and FIGS. 2 through 4 illustrate such an example in which four second cyclones 120 may be provided within the first cyclone 110. In a case where a plurality of second cyclones 120 may be provided therein, the second cyclones 120 may be formed to be in contact with each other or arranged to be spaced from each other, and an example in which the second cyclones 120 are arranged to be spaced from each other at predetermined intervals is illustrated in the drawing. Meanwhile, a plurality of second cyclones 120 may be provided in parallel to each other to efficiently discharge fine dust and air.

The second cyclone 120 may be configured to collect and deposit relatively heavy fine dust into the fine dust storage unit (D2) through the outlet 120b in a downward direction while discharging air from which fine dust is separated in an upward direction. The outlet 120b may form a structure of discharging fine dust in a circumferential direction and a downward direction of the casing 121, and may be beneficial in the performance of separating fine dust.

A cover 128 forming a bottom surface of the casing 121 may be mounted at a lower portion of the casing 121. In order to integrally form the guide vane 123, vortex finder 122 and casing 121, a space for forming a mold (for an example, cavity or core) coupled to a lower portion of the casing 121 may be needed, and thus the cover 128 may be coupled to a lower portion of the casing 121 with an additional element. A discharge pipe 129 extended to an inside of the casing 121 may be provided at the center of the cover 128, and a second discharge port 120b2 which will be described later may be formed at a lower portion of the discharge pipe 129.

The inlet 120a that introduces air and fine dust may be formed at an upper portion within the casing 121, and the vortex finder 122 that discharges air from which fine dust is filtered to an outside of the casing may be installed at an upper center within the casing 121. The guide vane 123 may be provided in the inlet 120a between an inner circumference of the casing 121 and an outer circumference of the vortex finder 122, and a specific structure associated with the guide vane 123 will be described later.

The second cyclone 120 may be installed to pass through the bottom surface 111d of the first cyclone 110, and a through hole 111d' may be formed on the bottom surface 111d, and the casing 121 may be coupled to the through hole 111d'. The outlet 120b of the second cyclone 120 that discharges fine dust may be provided at a lower end portion of the casing 121. An inner case 150 that accommodates the outlet 120b may be coupled to a lower portion of the first cyclone 110 to collect and deposit fine dust discharged from the outlet 120b into the fine dust storage unit (D2) within the inner case 150.

The outlet 120b may be configured to communicate an inner space of the second cyclone 120 with the fine dust storage unit (D2). The outlet 120b may include a first outlet 120b1 to discharge fine dust to an outer circumferential portion of the casing 121 and a second outlet 120b2 for discharging fine dust in a downward direction of the casing 121.

The first outlet 120b1 may be cut and formed on a lower outer circumference of the casing 121 to discharge fine dust rotationally flowing within the casing 121 to the inner case 150. The first outlet 120b1 may be formed at a lower side of the bottom surface 111d of the first cyclone 110 to discharge fine dust to the fine dust storage unit (D2). The second outlet 120b2 may be formed at a lower portion of the discharge pipe 129 in the cover 128 forming a lower surface of the casing 121.

Air containing fine dust introduced to an inside of the second cyclone 120 through the inlet 120a may induce rotational flow due to the guide vane 123. Mainly, the first outlet 120b1 may be configured to discharge rotationally flowing fine dust, and the second outlet 120b2 may be configured to discharge fine dust dropping by its own weight.

A first portion 151 of inner case 150 may be coupled to the skirt 111c to allow the inner case 150 to accommodate the first and the second outlets 120b1, 120b2 and collect fine dust. Furthermore, fine dust coming out of the first and the second outlets 120b1, 120b2 and dust collected on an inner surface of the first portion 151 may eventually be collected into an inner space of a second portion 152 of the fine dust storage unit (D2). Part of the fine dust may also remain on an inner circumference of the first portion 151.

Referring to FIGS. 4 and 5 together, a space between an inner circumference of the first cyclone 110 and an outer circumference of the second cyclone 120 is referred to as a first space (S1). The first space (S1) may form a passage capable of introducing air and fine dust introduced to an inside of the first cyclone 110 to an upper portion of the second cyclone 120. The cover member 130 may be provided at an upper portion of the second cyclone 120, and the cover member 130 may be provided to cover the inlet 120a of the second cyclone 120 at predetermined intervals to form a second space (S2) communicating the first space (S1) with the inlet 120a. According to the communication relationship, air introduced into the first cyclone 110 may be introduced into the inlet 120a at an upper portion of the second cyclone 120 through the first space (S1) and second space (S2).

As described above, the entrance 100a of the outer case 101 may be extended toward an inner circumference of the outer case 101 to rotate air in the first direction. FIG. 5 illustrates an example in which air rotates in a clockwise direction. Air containing fine dust may move upward in the first space (S1) and may pass through the second space (S2) to be introduced to the inlet 120a of the second cyclone, and the guide vane 123 may be formed with a structure configured to slope in the same direction as the first direction and angle downward to enhance the rotational flow performance of the introduced air.

The vortex finder 122 configured to discharge air from which fine dust has been separated may be provided at the center of an upper portion of the second cyclone 120. Due to the upper structure, the inlet 120a may be defined as an annular space between an inner circumference of the second cyclone 120 and an outer circumference of the vortex finder 122. The guide vane 123 which may extend in a spiral shape along an inner circumference may be provided at or in the inlet 120a of the second cyclone 120. According to the embodiment, the guide vane 123 may be integrally formed with the vortex finder 122 and casing 121. As described above, the casing 121 may have a cylindrical shape, and a lower surface of the casing 121 may be configured with a cover 128, which may be an additional member.

As the guide vane 123 may be integrally formed with the vortex finder 122 and casing 121 an additional process of coupling the guide vane 123 to an inner circumference of the casing 121 may not be required, which is a necessary process in a case where the guide vane 123 is configured as an additional member to the casing 121. This may reduce the manufacturing cost and manufacturing time of the vacuum cleaner.

Rotational flow may be generated in air introduced to an inside of the second cyclone 120 through the inlet 120a by the guide vane 123. Considering the flow of air and fine dust introduced into the inlet 120a in detail, the fine dust may flow down while rotationally moving in a spiral shape along an inner circumference of the second cyclone 120, and may eventually be discharged through the outlet 120b and collected in the fine dust storage unit (D2).

Relatively light air compared to fine dust may be discharged to the vortex finder 122 at an upper portion of the second cyclone 120 by suction power. Meanwhile, a plurality of ribs that extend in a radial direction may be provided on an inner circumference of the vortex finder 122 to mitigate the rotational flow of the discharged air. The plurality of ribs may be installed to be spaced from each other at predetermined intervals along the inner circumference of the vortex finder 122.

According to a structure in which the guide vane 123 is provided between the vortex finder 122 and the casing 121 as described above, contrary to the related art in which high-speed rotational flow is generated while being biased to one side by the guide passage, relatively uniform rotational flow may be generated over substantially an entire region. Accordingly, local high-speed flow may not be generated compared to the structure of the second cyclone in the related art, thereby reducing the flow loss due to this.

A plurality of guide vanes 123 may be arranged to be spaced from each other at predetermined intervals along an outer circumference of the vortex finder 122. Each of the guide vanes 123 may be configured to be started from the same first height 123b1 and extended to the same second height 123b2 on an outer circumference of the vortex finder 122. FIG. 6 illustrates an example in which the first position 123b1 is located higher than the second position 123b2. The guide vane 123 may be formed in an inclined manner downward along the first direction to further enhance the rotational flow of air inside the second cyclone 120. The guide vane 123 may have a structure that rotates air and fine dust in the first direction to move them downward, and such a structure may minimize the loss of rotational flow in the guide vane 123.

Figure 6:
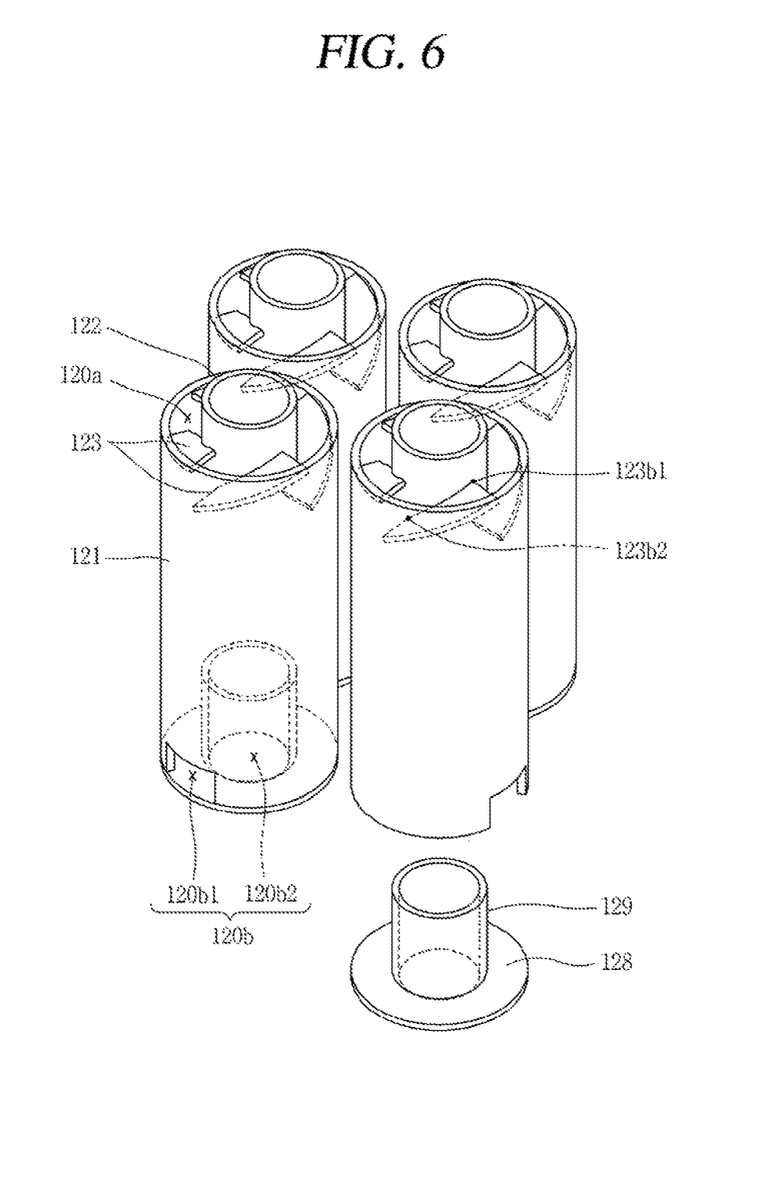
FIG. 6 is a view in which a second cyclone illustrated in FIG. 3 is shown in an enlarged manner.

Referring to FIG. 6, an example is illustrated in which the guide vane 123 may be formed in an inclined manner downward along a clockwise direction. Four guide vanes 123 may be arranged at 90° intervals along an outer circumference of the vortex finder 122. A larger number of the guide vanes 123 may be provided compared to the illustrated example, and at least part of any one guide vane 123 may be positioned to overlap with another guide vane 123 in a vertical direction of the vortex finder 122.

A lower diameter of the vortex finder 122 may be formed to be less than an upper diameter thereof. According to the foregoing shape, an area of the inlet 120a may be decreased from an upper portion to a lower portion to increase a speed of air flowing into the second cyclone 120, and fine dust introduced into the second cyclone 120 may be limited from being discharged through the vortex finder 122 along with air. Further, the vortex finder 122 may have a taper portion having a diameter that gradually decreases toward a lower end of the vortex finder 122.

An upper cover 140 may be provided on the cover member 130 to form a discharge passage to discharge air discharged through the communication hole 130a to an outside of the dust collector 100. The exit 100b of the dust collector 100 may be formed on the upper cover 140 to discharge air. The upper cover 140 may form an upper appearance of the dust collector 100. Air discharged through the exit 100b of the dust collector 100 may be discharged through an exhaust port of the cleaner body 11 to an outside of the cleaner body 11.

A porous pre-filter 145 configured to filter out ultra-fine dust from air may be installed on a passage extended from the exit 100b of the dust collector 100 to the exhaust port of the cleaner body 11. The casing 121 of the second cyclone 120 may be installed to pass through a bottom surface 111d of the first cyclone 110. A through hole 111d' for the insertion of the second cyclone 120 may be formed on the bottom surface 111d of the first cyclone 110.

As described above, the inner case 150 accommodating the outlet 120b may be installed at a lower portion of the first cyclone 110 to form the fine dust storage unit (D2) for collecting fine dust discharged through the outlet 120b. A lower cover 160 which will be described later forms a bottom surface of the fine dust storage unit (D2). Dust filtered out through the first cyclone 110 is collected into the dust storage unit (D1) between an inner circumference of the outer case 101 and an outer circumference of the inner case 150. The bottom surface of the dust storage unit (D1) may be formed by the lower cover 160.

Referring to FIG. 3, both the dust storage unit (D1) and fine dust storage unit (D2) may be formed to be open toward a lower portion of the outer case 101. The lower cover 160 may be coupled to the outer case 101 to cover an opening portion of the dust storage unit (D1) and fine dust storage unit (D2) so as to form a bottom surface of the dust storage unit (D1) and fine dust storage unit (D2). As described above, the lower cover 160 may be coupled to the outer case 101 to open or close a lower portion thereof. According to the present embodiment, the lower cover 160 may be coupled to the outer case 101 through a hinge 161 to open or close a lower portion of the outer case 101 according to the rotation thereof. However, embodiments may not necessarily be limited to this, and the lower cover 160 may also be coupled to the outer case 101 in a completely detachable manner.

The lower cover 160 may be coupled to the outer case 101 to form a bottom surface of the dust storage unit (D1) and fine dust storage unit (D2). The lower cover 160 may be rotated by the hinge 161 to discharge dust and fine dust at the same time so as to open the dust storage unit (D1) and fine dust storage unit (D2) at the same time. When the lower cover 160 is rotated by the hinge 161 to open the dust storage unit (D1) and fine dust storage unit (D2) at the same time, it may be possible to discharge dust and fine dust at the same time.

A plurality of ribs 103 for dust collection may be formed in a protruding manner on an inner circumference of the outer case 101 to collect the dust introduced into the dust storage unit (D1), and the ribs 103 for dust collection may be protruded toward the center of the outer case 101, for an example. A plurality of ribs 103 may be provided for dust collection, and in this case, they may be installed to be spaced from each other at predetermined intervals along an inner circumference of the outer case 101. The ribs 103 for dust collection may prevent dust collected in the dust storage unit (D1) from being rotated by the rotational flow of air introduced from an outside thereof, and prevent dust from being scattered or discharged to an unintentional place during the process of discharging dust, thereby facilitating the discharge of dust.

Figure 7:
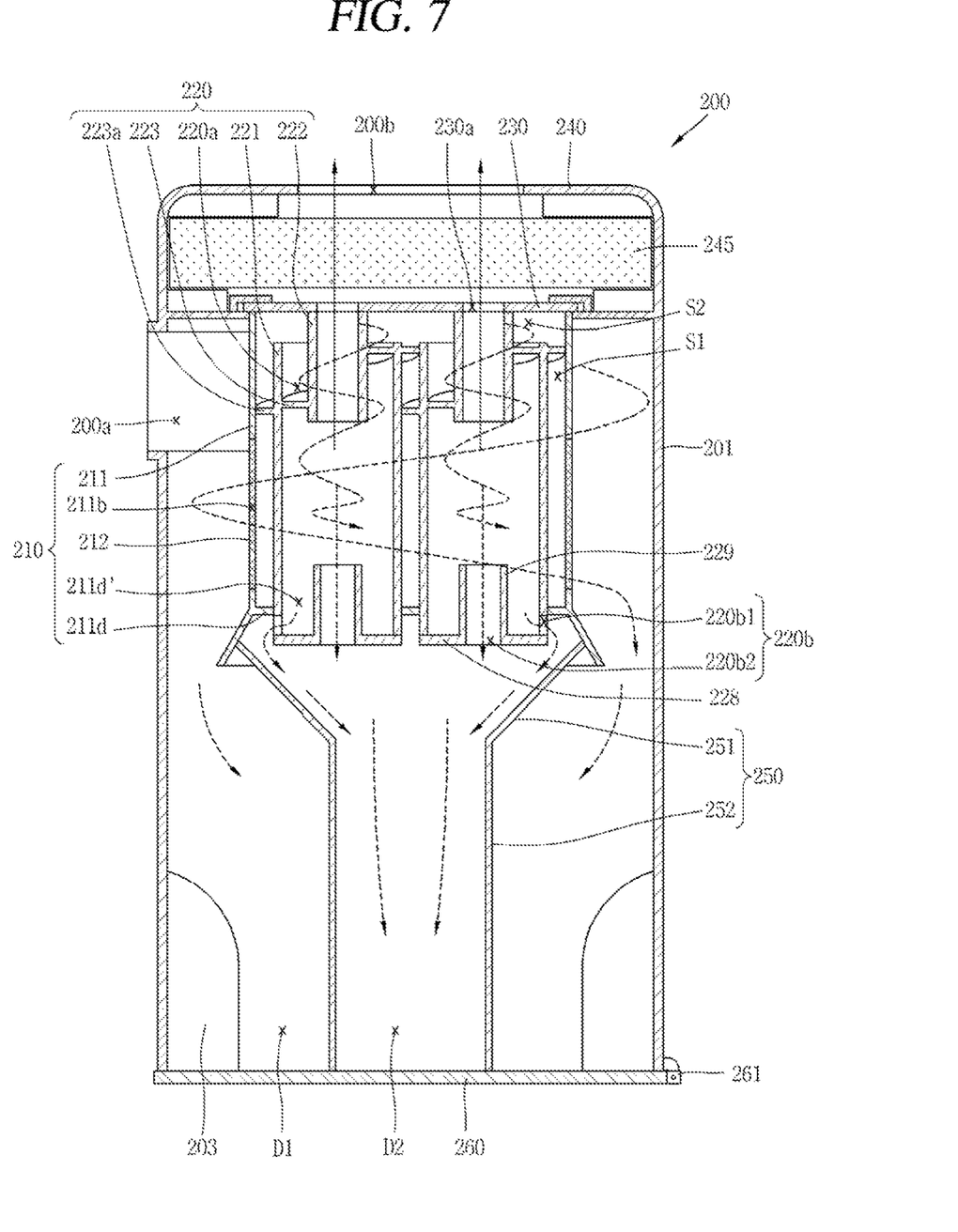
FIG. 7 is a longitudinal cross-sectional view illustrating an example of a dust collector according to another embodiment.

FIG. 7 is a longitudinal cross-sectional view illustrating an example of a dust collector 200 according to another embodiment. Referring to FIG. 7, the dust collector 200 according to another embodiment will be described.

The dust collector 200 according to another embodiment has a difference in providing an upward passage vane 223a between the first cyclone 210 and the second cyclone 220. The upward passage vane 223a spirally extends into a first space (S1) between the first cyclone 210 and the second cyclone 220 to induce rotational flow so as to introduce air to the inlet 220a of the second cyclone 220. A plurality of upward passage vanes 223a may be provided thereon, and arranged to be spaced from each other at predetermined intervals on an outer circumference of the casing 221.

When a plurality of second cyclones 220 are provided therein, the upward passage vane 223a may be provided at or in a first space (S1) between the first cyclone 210 and a second cyclone 220 and a space between two second cyclones 220. Meanwhile, when one second cyclone 220 is provided therein, the upward passage vane 223a is provided at or in the first space (S1). FIG. 7 illustrates an example in which a plurality of second cyclones 220 are provided therein and the upward passage vane 223a is provided at or in a first space (S1) and a space between two second cyclones 220.

As described above, air containing dust may be introduced to an inside of the outer case 201 through the entrance 200a to revolve in one direction, and the upward passage vane 223a may be formed in an inclined manner upward along the first direction to move fine dust containing air that has passed the mesh filter 212 upward while rotating in the first direction. The guide vane 223 formed in an inclined manner downward along the first direction has been described in the description of the dust collector 200 according to an embodiment.

Air that has passed through the first cyclone 110 may be easily introduced to the second cyclone 120 by the upward passage vane 223a without forming an additional passage on the inlet 120a of the second cyclone 120, thereby reducing introduction loss between the first cyclone 110 and the second cyclone 120. Furthermore, air that has passed the upward passage vane 223a may induce rotational flow, and enhance rotational flow while passing through the guide vane 123, thereby enhancing the separation performance of fine dust within the second cyclone 220.

According to the foregoing configuration, the second cyclone may be accommodated into the first cyclone, thereby reducing the height of the dust collector. A guide vane may be installed on an inlet of the second cyclone. The guide vane may be configured to induce rotational flow to air introduced to an inside of the second cyclone through the first and the second space. Accordingly, an additional guide passage extended from one side of the second cyclone is not required, thereby reducing passage loss during the introduction of air into the second cyclone.

A larger number of second cyclones may be arranged within the first cyclone. Accordingly, it may be possible to prevent the degradation of cleaning performance due to the arrangement in the second cyclone. A guide vane installed at an inlet of the second cyclone may strengthen rotational flow to air introduced to an inside of the second cyclone to enhance the separation performance of fine dust within the second cyclone. In this manner, the degradation of collection performance in a multi-cyclone may be prevented by the guide vane.

The guide vane may be integrally formed with the casing and vortex finder. A process of coupling one side of the guide vane to the casing may be omitted, thereby reducing the manufacturing cost and time. A dust storage unit and a fine dust storage unit may be configured to be both open during the separation of a lower cover, thereby discharging dust collected in the dust storage unit and fine dust collected in the fine dust storage unit at the same time during the opening.

A dust collector for a vacuum cleaner with a new structure in which a multi-cyclone structure is improved to lower down the height without reducing the cleaning performance is provided. A dust collector for efficiently introducing air that has passed through the first cyclone to the second cyclone as well as further enhancing the rotational flow of air introduced into the second cyclone is provided. A cyclone structure capable of facilitating the manufacture as well as reducing the manufacturing cost and time is also provided. A dust collector capable of collecting dust and fine dust in a separate manner as well as easily discharging them at the same time is also provided.

A dust collector for a vacuum cleaner may include a first cyclone provided within an outer case to filter out dust from air introduced from an outside thereof and introduce the air from which dust has been filtered out to an inside thereof, a second cyclone accommodated in the inside of the first cyclone to form a first space between the first cyclone and the second cyclone to separate fine dust from the air introduced to the inside of the first cyclone, and a guide vane spirally extended along an inner circumference of the second cyclone to induce rotational flow to the air introduced to an inside of the second cyclone through an inlet of the second cyclone via the first space, wherein the guide vane is integrally provided on the second cyclone. The second cyclone may include a cylindrically shaped casing forming an outer appearance, and a vortex finder provided at the center of the second cyclone to discharge air from which fine dust has been separated, wherein the guide vane is integrally formed with the casing and vortex finder on the inlet limited between an inner circumference of the casing and an outer circumference of the vortex finder.

A plurality of guide vanes may be provided and positioned to be spaced from each other at predetermined intervals along an outer circumference of the vortex finder. An entrance extended toward an inner circumference of the outer case may be formed at an upper portion of the outer case to rotate air introduced from an outside thereof in a first direction, and the guide vane may be formed in an inclined manner downward along the first direction to rotate air introduced into the inlet through the first space downward in the first direction to be introduced to an inside of the second cyclone.

The casing may be installed to pass through a bottom surface of the first cyclone, and an inner case provided with a fine dust storage unit configured to collect fine dust may be coupled to a lower portion of the first cyclone, and an outlet communicating an inside of the second cyclone with the fine dust storage unit to discharge fine dust to the fine dust storage unit may be provided on the second cyclone. The outlet may include a first outlet cut and formed on an outer circumference of a lower side of the casing to discharge fine dust in an outer circumferential direction of the casing, and a second outlet formed at the center of a lower side of the casing to discharge fine dust in a downward direction of the casing, wherein the inner case accommodates the first and the second outlet to collect fine dust discharged from the first and the second outlet into the fine dust storage unit.

A cover forming a bottom surface of the casing may be mounted at a lower portion of the casing, and a discharge pipe formed with the second outlet may be provided at the center of the cover. A skirt may be formed in a protruding manner along an outer circumferential surface at a lower portion of the first cyclone, and the inner case may be coupled to the skirt. The inner case may include a first portion coupled to the skirt and formed in a tapering manner downward, and a second portion extended downward from the first portion and arranged in a direction parallel to the outer case.

The first cyclone may include a housing formed to accommodate the second cyclone therein, and provided with an opening portion communicating with an inside on an outer circumference thereof, and a mesh filter installed to cover the opening portion to filter out and separate the dust from the air. An inner case configured to collect fine dust discharged from the second cyclone may be installed at a lower portion of the housing, and dust filtered out through the mesh filter may be collected into a dust storage unit between an inner circumference of the outer case and an outer circumference of the inner case.

The dust collector for a vacuum cleaner may further include a lower cover hinge-coupled to the outer case to form a bottom surface of the outer case and the inner case during the closing, and discharge dust collected in the dust storage unit and fine dust collected in the fine dust storage unit at the same time during the opening. The second cyclone may be accommodated into the first cyclone to reduce the height of the collector.

A guide vane may be installed on an inlet of the second cyclone. The guide vane may be configured to induce rotational flow to air introduced to an inside of the second cyclone through the first and the second space. Accordingly, an additional guide passage extended from one side of the second cyclone may not be required, thereby reducing passage loss during the introduction of air from the second cyclone.

A larger number of second cyclones may be arranged within the first cyclone. Accordingly, it may be possible to prevent the degradation of cleaning performance due to the arrangement in the second cyclone. A guide vane installed at an inlet of the second cyclone may strengthen rotational flow to air introduced to an inside of the second cyclone to enhance the separation performance of fine dust within the second cyclone. In this manner, the degradation of collection performance in a multi-cyclone may be prevented by the guide vane.

The guide vane may be integrally formed with the casing and vortex finder. A process of coupling one side of the guide vane to the casing may be omitted, thereby reducing the manufacturing cost and time. A dust storage unit and a fine dust storage unit may be configured to be both open during the separation of a lower cover, thereby discharging dust collected in the dust storage unit and fine dust collected in the fine dust storage unit at the same time during the opening.

The terms including an ordinal number such as first, second, etc. can be used to describe various elements, but the elements should not be limited by those terms. The terms are used merely for the purpose to distinguish an element from the other element.

In case where an element is "connected" or "linked" to the other element, it may be directly connected or linked to the other element, but also should be understood that another element may exist therebetween.

Unless clearly used otherwise, expressions in the singular number include a plural meaning.

In this application, the term "comprising," "including," or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner having a dust collector, the dust collector comprising:
   a first cyclone provided within an outer case to filter out dust from air introduced from an outside of the outer case; and
   at least one second cyclone accommodated inside of the first cyclone to form a first space between the first cyclone and the at least one second cyclone, wherein the at least one second cyclone separates fine dust from the air introduced to the inside of the first cyclone, and wherein the at least one second cyclone includes:

a cylindrically shaped casing having a first outlet formed on an outer circumference of a lower side of the casing to discharge fine dust in an outer circumferential direction of the casing;
a vortex finder provided at a center of an upper portion of the casing and through which air from which fine dust has been separated is discharged;
at least one guide vane spirally extended along an inner circumference of the casing to induce rotational flow of the air introduced to an inside of the casing through an inlet between the casing and the vortex finder via the first space, wherein the at least one guide vane is integrally formed with the casing and the vortex finder; and
a cover mounted at a lower portion of the casing and having a discharge pipe formed with a second outlet to discharge fine dust in a downward direction of the casing, the discharge pipe being provided at a center of the cover, wherein the first outlet and the second outlet are open in directions perpendicular to each other.

2. The vacuum cleaner of claim 1, wherein the at least one guide vane includes a plurality of guide vanes provided to be spaced from each other at predetermined intervals along an outer circumference of the vortex finder.

3. The vacuum cleaner of claim 2, wherein an air entrance extended toward an inner circumference of the outer case is formed at an upper portion of the outer case to rotate air introduced from an outside of the outer case in a first direction, and wherein the plurality of guide vanes are formed in an inclined manner downward along the first direction to rotate air introduced into the inlet of the second cyclone through the first space downward in the first direction to be introduced to an inside of the second cyclone.

4. The vacuum cleaner of claim 1, wherein the casing passes through the bottom surface of the first cyclone, wherein an inner case provided with a fine dust storage compartment configured to collect fine dust is coupled to a lower portion of the first cyclone, and wherein the first and second outlets communicate with the fine dust storage compartment.

5. The vacuum cleaner of claim 4, wherein a skirt is formed in a protruding manner along an outer circumferential surface of a lower portion of the first cyclone, and wherein the inner case is coupled to the skirt.

6. The vacuum cleaner of claim 5, wherein the inner case includes:
a first portion coupled to the skirt and formed in a tapering manner downward; and
a second portion extended downward from the first portion and arranged in a direction parallel to the outer case.

7. The vacuum cleaner of claim 1, wherein the first cyclone includes:
a housing formed to accommodate the second cyclone therein, and provided with an opening portion communicating with an inside on an outer circumference thereof; and
a mesh filter installed to cover the opening portion to filter out and separate the dust from the air.

8. The vacuum cleaner of claim 7, wherein an inner case configured to collect fine dust discharged from the second cyclone is installed at a lower portion of the housing, and dust filtered out through the mesh filter is collected into a dust storage compartment between an inner circumference of the outer case and an outer circumference of the inner case.

9. The vacuum cleaner of claim 8, further including:
a lower cover that is hinge-coupled to the outer case to form a bottom surface of the outer case and the inner case in a closed position, and discharge dust collected in the dust storage compartment and fine dust collected in the fine dust storage compartment at the same time when opened.

10. A vacuum cleaner having a dust collector, the dust collector comprising:
a first cyclone provided within an outer case to filter out dust from air introduced from an outside of the outer case;
at least one second cyclone accommodated inside of the first cyclone and forming a first space between the first cyclone and the at least one second cyclone, wherein the at least one second cyclone separates fine dust from the air introduced to the inside of the first cyclone;
at least one guide vane spirally extended along an inner circumference of the at least one second cyclone to induce rotational flow of the air introduced to an inside of the at least one second cyclone through an inlet of the second cyclone via the first space, wherein the at least one guide vane is integrally provided on the at least one second cyclone;
a first discharge port located at a lower portion of an outer circumferential surface of the at least one second cyclone; and
a second discharge port located on a bottom surface of the at least one second cyclone,
wherein the first discharge port and the second discharge port are open in directions perpendicular to each other.

11. The vacuum cleaner of claim 10, wherein the at least one second cyclone includes:
a cylindrically shaped casing; and
a vortex finder provided within the casing at the center of the at least one second cyclone to discharge air from which fine dust has been separated, wherein the at least one guide vane is integrally formed with the casing and vortex finder on the inlet between an inner circumference of the casing and an outer circumference of the vortex finder.

12. The vacuum cleaner of claim 11, wherein the at least one guide vane includes a plurality of guide vanes provided to be spaced from each other at predetermined intervals along an outer circumference of the vortex finder.

13. The vacuum cleaner of claim 12, wherein an air entrance extended toward an inner circumference of the outer case is formed at an upper portion of the outer case to rotate air introduced from an outside of the outer case in a first direction, and wherein the plurality of guide vanes are formed in an inclined manner downward along the first direction to rotate air introduced into the inlet of the second cyclone through the first space downward in the first direction to be introduced to an inside of the second cyclone.

14. The vacuum cleaner of claim 11, wherein the casing passes through a bottom surface of the first cyclone, and wherein an inner case provided with a fine dust storage compartment configured to collect fine dust is coupled to a lower portion of the first cyclone.

15. The vacuum cleaner of claim 14, wherein both the first discharge port and the second discharge port are configured to discharge fine dust into the inner case.

16. The vacuum cleaner of claim 15, wherein a skirt is formed in a protruding manner along an outer circumferential surface of a lower portion of the first cyclone, and wherein the inner case is coupled to the skirt, and wherein the inner case includes:

a first portion coupled to the skirt and formed in a tapering manner downward; and a second portion extended downward from the first portion and arranged in a direction parallel to the outer case.

17. The vacuum cleaner of claim 10, wherein the first cyclone includes:

a housing formed to accommodate the second cyclone therein, and provided with an opening portion communicating with an inside on an outer circumference thereof; and a mesh filter installed to cover the opening portion to filter out and separate the dust from the air.

\* \* \* \* \*